(No Model.)
R. RAKESTRAW.
ROTARY HARROW.
No. 301,921. Patented July 15, 1884.
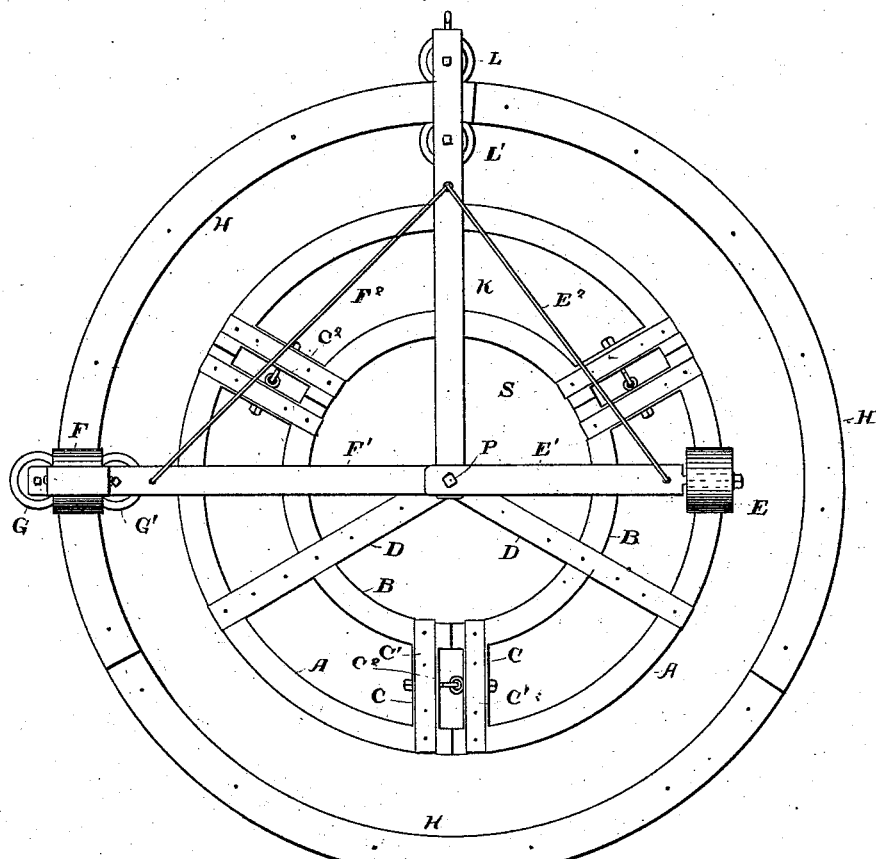
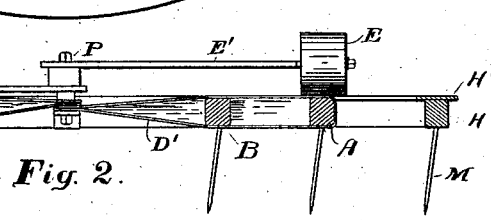
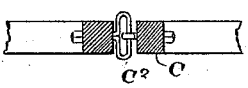
Witnesses:
H. W. Well
Richd. A. Goldsbrough
Inventor,
Roland Rakestraw,
per A. B. Upham,
His Attorney.

UNITED STATES PATENT OFFICE.

ROLAND RAKESTRAW, OF WYOMING, ILLINOIS.

ROTARY HARROW.

SPECIFICATION forming part of Letters Patent No. 301,921, dated July 15, 1884.

Application filed December 4, 1883. (No model.)

*To all whom it may concern:*

Be it known that I, ROLAND RAKESTRAW, of Wyoming, in the county of Stark, in the State of Illinois, have invented an Improved Rotary Harrow; and I do hereby declare that the following is a full, clear, and exact description thereof, reference being had to the annexed drawings, making a part of this specification, in which like letters of reference refer to like parts, and in which—

Figure 1 represents a plan view of the harrow; Fig. 2, a vertical cross-section thereof; Figs. 3 and 4, detail views.

This invention is in that line of harrows in which the frames of the same are pivoted at their centers to the propelling bars or beams, and in which the teeth are so slanted as to cause the revolution of said harrows about their centers.

In the drawings, A and B are two concentrically-bent or otherwise constructed beams, which, joined at their ends by the braces C C, form one section of the center harrow-frame, S. I usually form the harrow-frame S in three sections, as shown; but four or more are almost equally advantageous. From the center of the beam A extends radially the wedge-shaped bar D, strengthened by means of the strap-iron D', fastened to both upper and lower surfaces of the same. Each of the other sections, A B, is provided with a similar radial bar D. These bars D are secured together at the center of curvature of the sections A B by the bolt P, which also holds thereat the bars E', F', and K. The braces C C, by which the ends of the sections A B are made solid, are strengthened by strips of band-iron C', folded longitudinally along said braces and over the curved beams A B, as in Fig. 1. Suitable rivets or other fastenings secure the same in place. The different sections A B are held together end to end by means of eyes $C^2$, the vertical one of which is lengthened to allow considerable up-and-down play of the contiguous ends of said sections. The teeth of this center harrow, S, are inclined forward at their lower ends on one side of the center bolt, P, and backward on the opposite side, as in other rotary harrows. Upon the curved beams A the heavy roller E is held by means of its axial bar E', being retained upon the side of the harrow which has the forwardly-inclined teeth by means of a guy-rod, $E^2$, running from the said bar E' to the bar or beam K, to which the whiffletree is made fast. I usually insert the teeth M in the under side of the curved beams A B, and not in the braces C or radial bars D. Around this center portion of my harrow is another part, H, formed usually in three sections, concentric with said portion S, but of a larger diameter. Its teeth are also inclined, but in an opposite direction to those of S—that is, where the teeth M of the center part, S, are inclined forward, the neighboring teeth of the circular frame H are inclined backward. Upon the upper faces of the circular frame-beams H are fastened flat strips H', correspondingly curved, but wide enough to have their edges project beyond the sides of the beams H. To the under side of the beam K are rotatively secured the wheels L L', arranged to roll beneath the edges of the strips H'. In the same way the bar F' is furnished with wheels G G', and the circular frame H is thereby held concentric with the center frame, S, but not prevented from rotation. In addition to the wheels G G', the bar F' is furnished with a heavy roller, F, rotatively secured to said bar F' upon the frame H. Said bar F' is held at right angles to the beam K by the guy-rod $F^2$. The sections of the frame H are secured together end to end by means of the doubled strips of strap-iron T T', fastened to the ends of the sections by rivets or other fastenings, and to each other by the bolts $T^2$.

In using this harrow its forward progression, aided by the weight of the rollers F and E over the forwardly-projecting teeth, causes the two portions of the harrow to rotate, but in opposite directions. The object of this inverse revolution of the center frame, S, and circular frame H is twofold—first, to more thoroughly harrow the ground, and, next, to counteract the tendency of lateral deflection of the harrow. This lateral deflection of the harrow, when only the center part is used, is caused by the teeth passing over the ground at right angles to the line of progression of the harrow, and the teeth farthest from the front end of the beam K having more leverage about said point than the teeth nearest thereto, the former prevail and urge the harrow more or less in the lateral direction opposite to their motion. To overcome this deflection I have found that a slight bending of the teeth in toward the center, P, of the harrow will do the work. This inward inclination of the teeth need not be much when used in connection with my oppositely-revolving harrow; but when the center part, S, alone is used said inclination is increased.

What I claim as my invention, and for which I desire Letters Patent, is as follows, to wit:

1. The center harrow-frame, S, beam K, having wheels L L', bar F', having wheels G G', and roller F, in combination with the circular frame H, having strips H' and section-couplings T T', as and for the purpose set forth.

2. The sections A B, having braces C C, wedge-shaped radial bar D, and bolt P, in combination with the bar E', roller E, guy-rod $E^2$, beam K, having wheels L L', bar F', having wheels G G' and roller F, and the circular harrow-frame H, substantially as and for the purpose specified.

3. In a revolving harrow, means, substantially as described, whereby the side draft thereof may be partially or wholly overcome, such means consisting of the harrow-teeth inclined toward the center of revolution, and also tangentially inclined, as set forth.

In testimony that I claim the foregoing invention I have hereunto set my hand this 30th day of November, 1883.

ROLAND RAKESTRAW.

Witnesses:
    GEORGE W. SCOTT,
    GEORGE S. RAKESTRAW.